United States Patent
Kabra et al.

(10) Patent No.: US 11,023,497 B2
(45) Date of Patent: Jun. 1, 2021

(54) DATA CLASSIFICATION

(71) Applicant: INTERNATIONAL BUSINESS MACHINES CORPORATION, Armonk, NY (US)

(72) Inventors: Namit Kabra, Hyderabad (IN); Krishna Kishore Bonagiri, Ambajipeta (IN); Yannick Saillet, Stuttgart (DE); Mike W. Grasselt, Leinfelden-Echterdingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/569,036

(22) Filed: Sep. 12, 2019

(65) Prior Publication Data

US 2021/0081435 A1     Mar. 18, 2021

(51) Int. Cl.
   *G06F 16/28*     (2019.01)
   *G06F 16/22*     (2019.01)

(52) U.S. Cl.
   CPC .......... *G06F 16/285* (2019.01); *G06F 16/221* (2019.01)

(58) Field of Classification Search
   CPC .............................. G06F 16/285; G06F 16/221
   See application file for complete search history.

(56) References Cited

U.S. PATENT DOCUMENTS

2013/0297661 A1* 11/2013 Jagota ................... G06F 40/216
                                                         707/822
2015/0379093 A1* 12/2015 Couris .................. G06F 16/248
                                                         707/722

(Continued)

FOREIGN PATENT DOCUMENTS

CN     109543771 A     3/2019
CN     109871896 A     6/2019

OTHER PUBLICATIONS

Chauhan, G., "All About Logistic Regression In One Article" Retrieved on Jun. 13, 2019 from the Internet URL: <https://towardsdatascience.com/logistic-regression-b0af09cdb8ad>, Oct. 10, 2018, 15 pgs.

Mell, Peter, et al., "The NIST Definition of Cloud Computing", NIST Special Publication 800-145, Sep. 2011, Gaithersburg, MD, 7 pgs.

* cited by examiner

*Primary Examiner* — James Trujillo
*Assistant Examiner* — Michal Bogacki
(74) *Attorney, Agent, or Firm* — William Hartwell; Matthew M. Hulihan; Heslin Rothenberg Farley & Mesiti PC

(57) ABSTRACT

Data classification includes tracking classification of columns of data into data classes of a collection of classes available for classifying the columns, obtaining a target column of data, of a target dataset, to be classified into a data class of the collection of candidate classes, and classifying the target column of data into a data class of the collection of classes based on historical data classification characteristics provided by the tracking. The classifying includes selecting a group of candidate data classes of the collection of classes to compare to value(s) of the target column, the selecting excludes at least some candidate data classes of the collection from comparison to the value(s), and establishing a priority between the candidate data classes of the group of candidate classes in comparing the value(s) of the target column of data to the selected group of candidate classes.

20 Claims, 8 Drawing Sheets

(56) References Cited

U.S. PATENT DOCUMENTS

| | | | |
|---|---|---|---|
| 2017/0060919 A1* | 3/2017 | Ramachandran | G06F 16/258 |
| 2017/0109424 A1 | 4/2017 | Oberhofer et al. | |
| 2017/0161358 A1* | 6/2017 | Tadeski | G06F 16/221 |
| 2018/0075104 A1* | 3/2018 | Oberbreckling | G06F 16/254 |
| 2019/0018866 A1* | 1/2019 | Ormont | G06N 5/003 |
| 2019/0130027 A1 | 5/2019 | Maier et al. | |
| 2019/0251194 A1* | 8/2019 | Fender | G06F 16/2272 |
| 2019/0286949 A1* | 9/2019 | Sherman | G06K 9/6293 |
| 2019/0303467 A1* | 10/2019 | Williams | G06F 16/2282 |

| 202 | 204 | 206 | 208 |
|---|---|---|---|
| Data Class | Description | Type | Data that is considered during classification |
| Account number | A string representing an account number. The column name is analyzed to see if it matches the following regular expression: columnaccount\|acc\|accnumber\|accnum\|accno\|accountnumber | Regex | Column data |
| Address Line 1 | Address Line 1 of a multi-line address. The address values are classified based on the following logic:<br>Column names are searched to see if they have the substring 'addr' and end with '1/2/3' or 'one/two/three'.<br>The data type is searched to verify that it is a string.<br>... | Java | Column data and metadata |
| City | A name of a place such as a city or town. | Value list | Column data |
| Computer Host Name | Hostname is a label that is assigned to a device connected to a computer network and is used to identify the device. | Java | Column data |
| Credit Card Expiration Date | A date value in format month/year representing a credit card expiration date. | Java | Column data |
| Credit Card Number | A credit card number. | Java | Column data |
| Credit Card Validation Number (security code) | A 3 or 4 digit number representing a credit card validation number. | Java | Column data |
| Date | Data values which are specific date, time, or duration references, for example, a product order date. | Java | Column data |
| Date of Birth | Data values which are dates, and represent a date of birth. | Java | Column data and metadata |
| Driver's License | A string representing a driver's license. | Regex | Column data and metadata |
| Email Address | An email address identifies an email box to which email messages are delivered. | Java | Column data |
| First Name (sub-category of Person Name) | First name of an individual. | Java | Column data |

FIG. 2A

| 202 | 204 | 206 | 208 |
|---|---|---|---|
| Data Class | Description | Type | Data that is considered during classification |
| Middle name | The middle name of an individual. | Java | Column data and metadata |
| Person Name | The name of an individual. | Java | Column data |
| State/Province name | The name of a state or province of a country. | Value list | Column data |
| Universal Product Code | The Universal Product Code (UPC) is a barcode symbology that is widely used in many countries, for tracking trade items in stores. | Java | Column data |
| US Phone Number | US Phone Number is a string of specific numbers that a telephone or cell phone user can dial to reach another telephone or mobile phone in the United States (US). | Regex | Column data |
| US Social Security Number | In the United States, a Social Security number (SSN) is a unique 9-digit number issued to US citizens, permanent residents, and temporary (working) residents. | Regex | Column data |
| US Zip | US ZIP codes are a system of postal codes used by the United States Postal Service (USPS) since 1963. | Java | Column data |

FIG. 2B

| | 302 | 304 | 306 | 308 | 310 |
|---|---|---|---|---|---|
| 301 → | First Name | M.I. | Last Name | Date | Sign |
| | ... | ... | ... | ... | ... |
| | ... | ... | ... | ... | ... |
| | ... | ... | ... | ... | ... |
| | ... | ... | ... | ... | ... | ns
DATA CLASSIFICATION

BACKGROUND

Enterprises generate data from business processes and tasks. The lifecycle of data elements is commonly referred to as enterprise information lifecycle management (EILM). EILM applies policies based on the business classification of data. Often this enables effective management of the information. A basic tenet of EILM is to identify and classify data elements based on the business criticality of the data and the nature of the business. Desired data management policies for creation, distribution, consumption, disposition, and destruction then apply to the classified data elements. In this manner, data classification is used as a tool for classifying data that can be used by enterprises to answer questions as to which types of data are available, whether the data is protected with the proper controls, and whether such controls meet compliance requirements that may be mandated by the enterprise, industry, and regulators.

Proper data classification provides the following benefits, among others, to enterprises: (i) data compliance and risk management; (ii) optimization of data encryption needs (not all data needs to be encrypted); (iii) better control of disaster recovery and business continuity needs; (iv) enhanced metadata management stemming from classification of data assets; and (v) appropriate data security controls and access based on the criticality of the data. In sum, proper data classification can be used to protect enterprises from compliance issues and plays a vital role in EILM.

SUMMARY

Shortcomings of the prior art are overcome and additional advantages are provided through the provision of a computer-implemented method. The method tracks classification of each column of data, of columns of data, into a respective data class of a collection of candidate data classes that are available for classifying the column of data. The tracking provides historical data classification characteristics for subsequent use. The method also obtains a target column of data of a target dataset. The target column of data is to be classified into a data class of the collection of candidate data classes. The method also classifies the target column of data into a data class of the collection of candidate data classes based on the historical data classification characteristics provided by the tracking. The classifying includes selecting a group of candidate data classes of the collection of candidate data classes to compare to at least some data values of the target column of data. The selecting excludes at least some candidate data classes of the collection of candidate data classes from comparison to the at least some values of the target column of data. The classifying also establishes a priority between the candidate data classes of the group of candidate data classes in comparing the at least some data values of the target column of data to the selected group of candidate data classes.

Further, a computer system is provided that includes a memory and a processor in communication with the memory. The computer system is configured to perform a method. The method tracks classification of each column of data, of columns of data, into a respective data class of a collection of candidate data classes that are available for classifying the column of data. The tracking provides historical data classification characteristics for subsequent use. The method also obtains a target column of data of a target dataset. The target column of data is to be classified into a data class of the collection of candidate data classes. The method also classifies the target column of data into a data class of the collection of candidate data classes based on the historical data classification characteristics provided by the tracking. The classifying includes selecting a group of candidate data classes of the collection of candidate data classes to compare to at least some data values of the target column of data. The selecting excludes at least some candidate data classes of the collection of candidate data classes from comparison to the at least some values of the target column of data. The classifying also establishes a priority between the candidate data classes of the group of candidate data classes in comparing the at least some data values of the target column of data to the selected group of candidate data classes.

Yet further, a computer program product including a computer readable storage medium readable by a processing circuit and storing instructions for execution by the processing circuit is provided for performing a method. The method tracks classification of each column of data, of columns of data, into a respective data class of a collection of candidate data classes that are available for classifying the column of data. The tracking provides historical data classification characteristics for subsequent use. The method also obtains a target column of data of a target dataset. The target column of data is to be classified into a data class of the collection of candidate data classes. The method also classifies the target column of data into a data class of the collection of candidate data classes based on the historical data classification characteristics provided by the tracking. The classifying includes selecting a group of candidate data classes of the collection of candidate data classes to compare to at least some data values of the target column of data. The selecting excludes at least some candidate data classes of the collection of candidate data classes from comparison to the at least some values of the target column of data. The classifying also establishes a priority between the candidate data classes of the group of candidate data classes in comparing the at least some data values of the target column of data to the selected group of candidate data classes.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 2A-2B collectively depict an example table of data classes enabled for a data classification system, in accordance with aspects described herein;

DETAILED DESCRIPTION

Described herein are approaches for data classification. Data classes are assets that categorize database columns and data file fields according to the type of the data and how the data is used. Data classification systems can use any desired set of data classes against which to classify data. Some example systems use potentially hundreds of data classes for classifying data.

When a data column is to be classified into a data class, each of the participating column values are compared against each of the available ("candidate") data classes to discover to which potential data class(es) the data value belongs. Though done on a value-by-value basis for values in a column, in a structured dataset, all values in a column are expected to be of the same data class; the column as a whole contains values of that same class (often, however, with the column title, if provided, being an exception). In classification, some elementary optimizations could exist, for example a data class of integer values may not be tested for a column containing string values. Conventional practice also follows the following:

Data classification of structured data is done by testing the values (or the metadata or properties) of each column against the classifiers associated to the searched data class;

Each data class to be found is associated with a classifier, which is akin to a rule or heuristic defining how to decide whether a tested value or a column as a whole matches the classification criteria of the data class;

Examples of classifiers are regular expressions (regex), list of values, or other rules returning a confidence that the column matches the data class;

In the above process, each target column is tested independently from each other column without taking into consideration the context of the target column or what has been found in other columns of the same data set.

As a basic example for illustration, assume data in a target column to be classified contains string values, and that there are 100 available data classes. In one approach, all target column values (save for the column title perhaps) are to be compared against the 100 data classes to determine to which class the target column belongs. If there are multiple matches, the 'best' will be selected using a selection approach. If there are 1,000 records in the column, there could potentially be 1,000*100=100,000 comparisons in order to inform the selection of the correct data class. Embodiments of aspects described herein can address and overcome these and other deficiencies.

Figure 1:
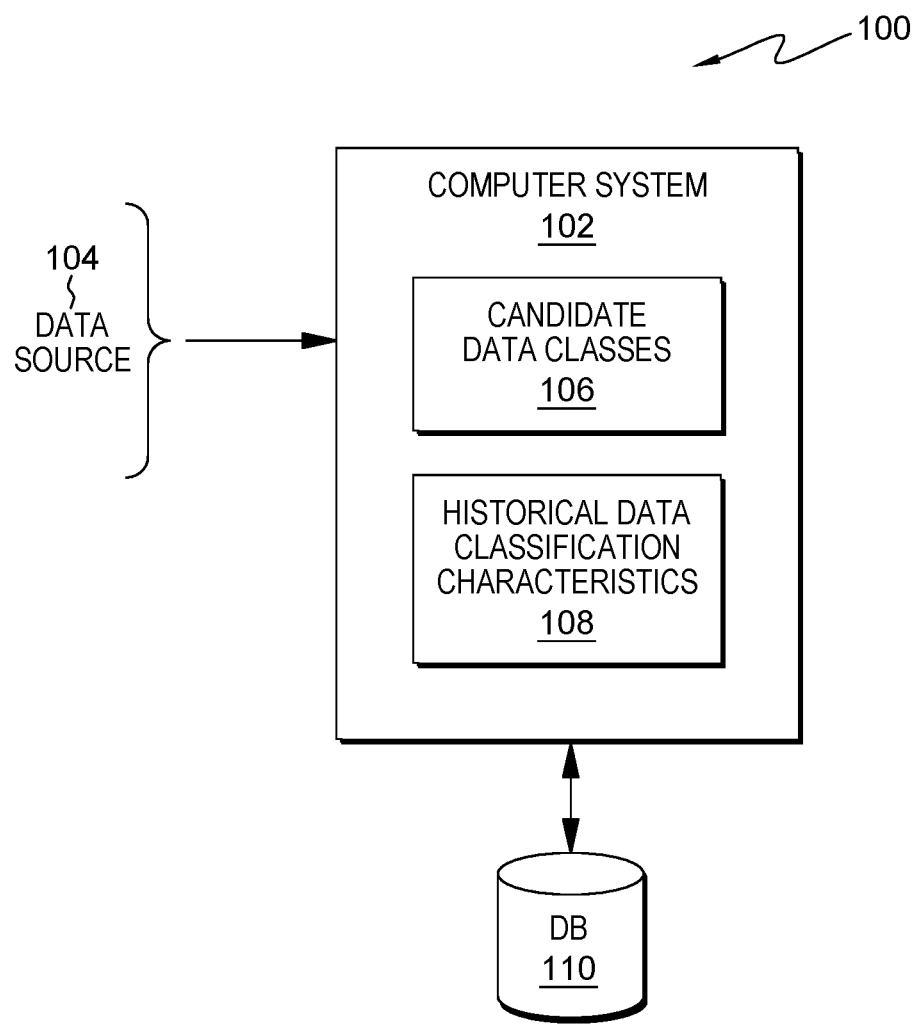
FIG. 1 depicts an example environment to incorporate and use aspects described herein.

FIG. 1 depicts an example environment to incorporate and use aspects described herein. In the environment 100 of FIG. 1, a computer system 102 responsible for data classification receives data from a data source 104. The data source could be any source of data, for instance a data lake, another computer system streaming data to system 102, or any other source of data. Generally, receipt of data triggers a data analysis workflow against the streaming data. The data analysis workflow is to classify the received data, i.e. identify the data classes that exist in the dataset. The received data is structured, as received, into sets with identifiers, typically into 'columns' having column names.

Classification is by way of processing that compares data values to data classes of a set of candidate data classes 106 of which the system 102 is aware or that are being applied for a particular run. In accordance with aspects described herein, the system 102 tracks historical data classification characteristics 108, that is, characteristics of data classifications that it (and/or companion systems) have made in the past against received data. This could include data that is part of the same dataset and/or data of other dataset(s) already classified. In this example, the data classification system 102 further processes the received and classified data by storing it to database 110, possibly after applying modifications, transformations, or the like based on the data classes assigned to the various columns of the received data. In other examples, system 102 forwards classified data to another system for processing.

FIGS. 2A-2B collectively depict an example table of data classes enabled for a data classification system, in accordance with aspects described herein. The example table of FIGS. 2A-2B presents example candidate data classes in column 202, a description of each class in column 204, the data class type in column 206, and an indicator in column 208 of which data is considered during classification (e.g. column data/values and/or column metadata). Each row of the table of FIGS. 2A-2B, except for the top row, corresponds to a respective data class.

Figures 3, 4:
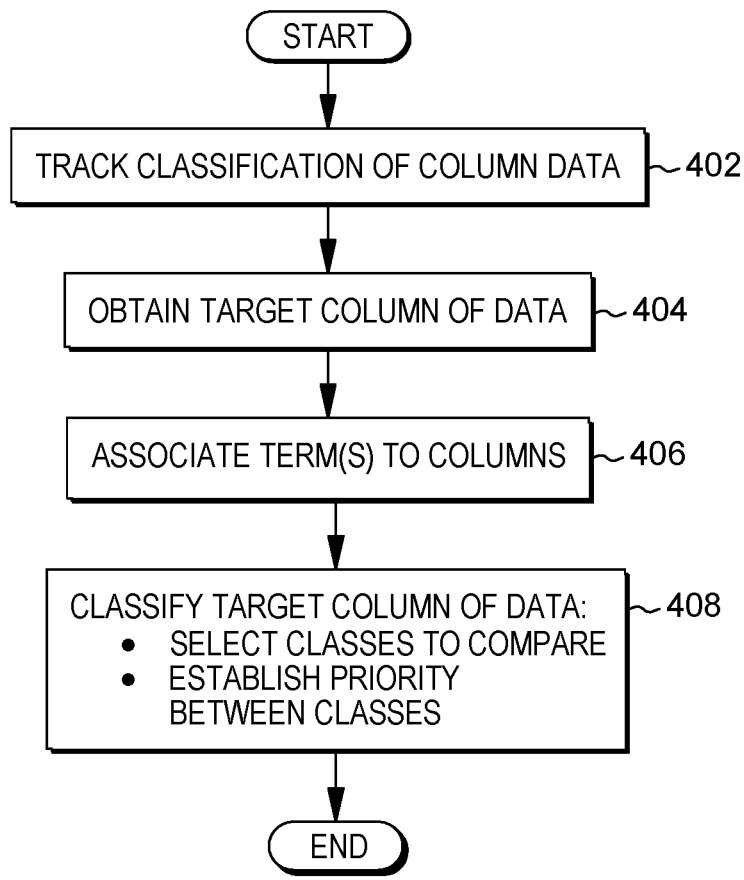
FIG. 3 depicts an example dataset structured into a plurality of columns.
FIG. 4 depicts an example process for data classification, in accordance with aspects described herein.

FIG. 3 depicts an example dataset structured into a plurality of columns. The dataset is an example dataset of target columns to be classified. Actual data values of only the first row, 301, indicating columns names is shown in FIG. 3. Columns 302, 304, 306, 308, and 310 are named 'First Name', 'MI', 'Last Name', 'Date', and 'Sign'. It is understood that rows below the first row 301 would include data values under the different columns but are presented as ' . . . ' in this example for convenience.

Typically, each row would correspond to a 'record' of data for a single entity. In this simple example, the entities are people, and the data presents person data, generally speaking.

As discussed above, conventional practice might compare each data value of each column of the data set against each of the available data classes. This can be extremely time consuming when the dataset is large and/or the candidate data classes are numerous. Aspects described herein present approaches to reduce the number of candidate data classes to compare to value(s) of a target column of data. This reduces classification time, processor cycles, and power, and provides additional benefits.

Some embodiments reduce the number of data class candidates to match against through the usage of governance, clustering, and/or machine learning as described herein.

Using governance for instance, aspects can assign terms/tags to a target column to be classified, and select, as the candidate data class(es), of the larger collection, to compare to value(s) of the column only those data classes that have been similarly tagged with those terms. In this aspect, additional terms/tags can be assigned to the columns prior to data classification. These terms could be manually assigned by a user/admin and/or automatically assigned, for instance based on a column title and/or column metadata, for example.

Using machine learning, for instance, aspects can determine which of the candidate data classes of the collection are more likely to match the data of the target column. Machine learning based on historical data classifications or eventual data models can help select which classes are worth comparing to value(s) in the column and/or the priority in which selected classes are best compared to the column values. This can reduce the number of data classes to attempt to match against. When a particular class matches with a threshold level of confidence, further comparison (i.e. to lower-priority data classes) could be avoided, for example. Particular enterprises know the type of data they expect to receive. With this in mind, a data architect could model the data warehouse, which could inform what types of classes should be expected and which to look for when performing data classification on incoming data. Additionally or alternatively, a business 'glossary' referring to a dictionary particular to the enterprise, industry, or data domain can help inform this leaning by establishing a terminology expected to appear in or be assigned to the target columns. At least some terminology used in medical records can reasonably be expected to differ from at least some terminology used in sales data, for instance. The business glossary can provide vocabulary used in describing the business meaning of the data (and used in column names, metadata, term assignments, etc.). Terms of the glossary could then potentially be mapped to data classes in the collection of candidate data class so that data classes in the available collection can be correlated to target dataset columns.

Data clustering presents an additional opportunity. A group or set of data classes that have similar or related probabilities of matching a given target column name is an example data class cluster. Clusters can be based on, derived from, and modified by historical outcomes. As a basic example, if past-classified columns having the column name "Customer Number" have been successfully classified 20 times into the data class 'US Social Security Number' and 15 times into the data class 'US Phone Number', then the two classes 'US Social Security Number' and 'US Phone Number' might be clustered together. If the 'US Social Security Number' data class is selected for comparison against a data value of a target column being classified, then the 'US Phone Number' data class might also be selected for comparison on the basis of being clustered with 'US Social Security Number'.

Additionally or alternatively, clustered data classes could be clustered on the basis that they tend to appear as part of a common or close domain. In the sales domain, for example, data of a dataset might typically include a column of the 'Invoice Number' data class, a column of the 'Product Number' data class, and a column of the 'Quantity' data class. In this case, the three classes could be clustered so that if a target column of one class is found, then the other classes could be included for comparing against nearby column(s) of the dataset. As another example, in the domain of 'people data', data of the dataset might typically include a column of the 'First Name' data class, a column of the 'Middle Initial' data class, and a column of the 'Last Name' data class, among others, which therefore could be clustered together. Clustering in this example might be extremely useful if column names do not match data class names. In the example of FIG. 3, column name "M.I." appears to be an abbreviation for "Middle Initial". After identifying the 'First Name' and 'Last Name' column names and/or actually classifying one or both of those columns with their respective data class (First Name' and 'Last Name', respectively), then clusters having the 'First Name' and/or 'Last Name' data classes could be read to identify that the 'Middle Initial' data class is likely to appear as a column in the dataset. On this basis, column 304 with the ambiguous name 'M.I.' might easily be identified as likely being of the 'Middle Initial' data class.

Thus, in tracking historical (i.e. past, completed) classifications of columns of data into data classes of a collection of data classes, this can include establishing clusters of candidate data classes, of that collection of candidate data classes, that have classified related columns of data. Based on some relation(s) observed between columns that have been classified, the respective data classes can be clustered. Example relations include same or similar column name, and contextual relation (proximity, domain, order, as examples). Specifically, establishing the clusters could establish a cluster that clusters candidate data classes related by common terms of a glossary of terms directed to a specific business domain. In an example, a cluster is established for candidate data classes that have classified columns of data having lexicographically similar column names, as the relation between the classified columns of data. In selecting the candidate data classes to compare to value(s) of a target column, this can include selecting the classes of that cluster based on the column name of the target column of data matching to the lexicographically similar column name(s) that are part of the cluster.

"Lexicographically similar" is defined to mean that two names are (i) the same (e.g. alphanumerically identical), (ii) similar based on having common substring(s) or low edit distance(s) compared to each other, (iii) identified as synonyms in a glossary, and/or (iv) variant ways of writing the same thing, for instance one as an abbreviation of the other (as with column 304 of FIG. 3). In a particular example, two names are lexicographically similar if the Levenshtein edit distance as between to two is below a predefined threshold.

Establishing the clusters of candidate data classes could establish a cluster that clusters candidate data classes that have classified columns of data appearing together in a selected context, for instance ones that appear in a given order, ones that tend to appear proximate each other, for instance within some threshold number of columns apart, and/or ones that are commonly found in a given business domain or context of the target column or dataset. A contextual relation between one or more classified column(s) of data can be identified as the context in which an encountered target column of data appears. Based on classifying the one or more column(s) of a target dataset, the context can be recognized and an appropriate one or more clusters pertaining to that context can be identified and inform other data classes to be tested. As a specific example, if a column for the 'First Name' data class followed by a column for the 'Middle Initial' data class have been identified (see columns 302 and 304 of FIG. 3), then, based on a clustering with the 'Last Name' data class, the next consecutive target column (e.g. 306) could be tested against the 'Last Name' data class for a possible immediate and high-confidence classification of that column. Continuing with the example of FIG. 3, the column names Date and Sign if considered in a vacuum might be assumed to refer to birthdate ('Date of Birth' data class) and astrological sign (Astrological Sign' data class) of each person entity in the table. However, based on the particular business domain (say customer account sign-up transactions), machine learning, or other knowledge, the First Name, Middle Initial, and Last Name data classes might be clustered with the 'Date' and the 'Boolean' data classes, corresponding to a signature date column (308) indicating a date of customer signature and a Boolean indicator column (310) indicating whether the customer signed a particular disclaimer applicable to the relationship between the individual and the enterprise. Clustering in this manner can help easily distinguish the two cases.

In some embodiments, the historical classification characteristics identify classifications that are statistically likely to coexist. Historical outcomes of classification results can be tracked for each of several columns of data. The classification of each such column into a respective data class of a collection of candidate data classes that are available for classifying the column of data are tracked to produce characteristics of the classifications. The characteristics are knowledge—confidence levels, clusters, trends, related terms, etc.—that can be applied to the classification of other target columns. Scanning of the historical classifications can occur continuously, periodically or aperiodically, and clusters can be updated accordingly to add or remove data classes from them. As noted, a cluster can inform of data classes to select for comparison against data values in a column. If a data class is identified as matching a given data value or at least suggested as a possible data class for the column, then the classes in any cluster(s) of similar classes in which that class is present may be selected as a candidate data class to compare to value(s) of the column. Additionally or alternatively, this can inform which classes to eliminate as a possible classification, i.e. avoid comparing to values of the column. For instance, classes not clustered with the given data class could be eliminated as candidates. Thus, when classifying a target column, a data value of the target column could be matched to a data class of a cluster, and then a selection of a group of data classes to compare to value(s) of the column can include selecting the other data classes of the cluster for inclusion in the selected group of candidate classes, based on matching the data value to the data class of the cluster.

An example data classification process can additionally or alternatively include a term assignment to columns using data governance tools, to associate, based on, e.g., a column name of a target column of data, one or more terms with the column of data, thereby tagging the column with tag(s)/term(s). Data governance tools refers to programs/rules governing the overall management of data availability, relevancy, usability, integrity and security in the enterprise. Different dataset classes can be associated with each of those terms. Through machine learning, a confidence in such association between terms and the dataset classes can be established. Therefore, in the tracking of the classification of columns of data, this can determine confidence levels of associations between term(s) and the candidate data classes in the collection of candidate data classes that are available for classifying target columns of data, and can further assign the terms to the candidate data classes. Data class(es) selected for comparison to value(s) of the target column can include those classes that have a confidence level of related terms above a set threshold value of confidence.

In classifying a target column of data into a data class of a collection of candidate data classes based on historical data classification characteristics provided by the tracking, the classifying can include selecting a group of candidate data classes of the collection of candidate data classes to compare to at least some data values of the target column of data. This selection selects against which class(es) value(s) of the column will be compared. It is noted that, in some embodiments, not every value of a column is tested against the one or more selected classes; it is possible that a column of data might be confidently classified without testing every value in the column against the data class. In selecting the group of data classes of the collection, this excludes at least some candidate data classes of the collection of candidate data classes from comparison to value(s) of the target column of data.

Selecting the group of candidate data classes can be further based on the determined confidence levels, i.e. those from tracking the historic classifications, which learns which terms assigned to columns work well for which data classes. This then informs a confidence level that a column associated with a given term might properly be classified with a given data class. The selection of the group of classes to use for classifying the target column can be based on those confidence levels. For instance, any class with a confidence level above some threshold (say 50%) in classifying columns associated with a given term (say the term "Name" or "credit card") may be selected for comparison to value(s) in the target column.

Additionally or alternatively, the selecting can select at least one candidate data class, of the group of candidate data classes, based on the at least one data class having been previously associated with the term(s) assigned to the target column, and/or the at least one data class having been previously selected to classify columns of data, of the historically classified columns of data, that are also associated with the term(s). In other words, in classifying a target column associated with term(s), a data class may be selected for inclusion in the group of classes to be tested against based on (i) the class already having been associated with those term(s) and/or that class already having been used as the classification of other column(s) associated with those term(s).

Also in classifying a target column of data, a priority can be established between the candidate data classes that are selected for comparison to value(s) of the column. The priority is the order in which the selected classes are to be compared to the data value(s) of the column. In other words, there can be a prioritization of the classes relative to each other. This could be done using any desired approach. Generally, the higher the confidence that a class is the correct one, the higher its priority could be. In some examples, the column is classified without traversing the entire list of selected classes, for instance if a higher priority class is found to confidently classify the target column. In that case, the classification processing could end before testing the other selected data classes of lower priority.

Aspects differ from a conventional approach that considers data classification of each columns independent from the classification of other columns. However, the context in which a column appears can be informative. When columns preceding and/or succeeding an encountered "DATE" column have names like "Cardholder Name", "Card Number", and "Card Type", it is likely that the DATE column identifies an "Expiration Date" column, which matches to an appropriate class (e.g. 'Expiry Date'). Alternatively, if the "DATE" column is preceded or succeeded by columns named "Name/Student Name", "ID Number", "Class", then it would be appropriate to consider the "DATE" column as a "matriculation date" or "birth date", as informed by historical classifications. Observing the preceding or succeeding columns identifies a context that sets up an expectation for the classification of the "DATE" column. The 'Expiry Date' class could be selected as a next class to compare on the basis that it is clustered with the 'Cardholder Name' and 'Card Number' data classes.

To establish context-based clusters, previous classification results can be scanned to understand the previous, subsequent, and/or proximate columns when a column name C_X matches a dataset class DC_Y. Through machine learning, this can prepare a pattern of these columns, useful in predicting or considering the dataset class DC_Y as a candidate for matching the column name C_X. More generally, the scanning can identify contexts in which columns of given sets of data classes tend to appear.

In a particular embodiment of aspects described herein, the following is followed:

1. Obtain (e.g. read) a target column of data of a target dataset. The target column of data is to be classified into a data class of a collection of candidate data classes.

2. Perform a term assignment, e.g. based on column name, and select a list (e.g. cluster) of the data classes that are typically assigned to column(s) also assigned the given term. This selected cluster ("cluster1") could be a group (one or more) of class(es) that is/are prior-associated with the term that is also assigned to the target column of data.

3. Read a sample of data values of the column and check the data values against the candidate data classes of the collection. Get a list of data classes that match (properly classify) at least one of the sample data values. This selected cluster ("cluster2") includes the data classes to which any data value of the value(s) of the target column of data are found to match.

4. Using an algorithm such as 'Apriori', determine the data class(es) that would typically classify the target column based on the location of the particular column relative to other column(s). For example, Middle Name and Last Name typically appear after the First Name column. This third group ("cluster3") of class(es) are those that historically appear together with the target column of data (i.e. columns having that column name, for instance) in a selected context.

5. Take the union of cluster1, cluster2, and cluster3, which is to say find the data class(es) that appear in each of the three clusters. From this union, eliminate those data class(es) that belong to a domain different from the current domain. Domain refers generally to the overall context for the dataset itself.

6. At this point there are n (n>=1) data class(es). If n=1, then that is the selected data class for the column. Otherwise (i.e. n>1), confidence scores and/or other metric(s) is/are used to prioritize these n data classes into an order, i.e. of most-to-least likely to be the proper data class for the column. Then each data value in the column (except column name) is compared against the ordered/prioritized data classes beginning with the top priority and comparing against the top k (k>=1) priority classes. Since a confidence/threshold can be used to dictate the point at which to stop traversing this prioritized list of data classes, then it may result in value-by-value comparison of only k number of classes, rather than all of the n remaining data classes.

It is noted that at least some of the selected classes for the comparison might be selected dynamically after the classification of the column has commenced. If a value is tested against one class and found to be a match to that class, this might inform of other classes (e.g. those clustered with the one class) to be selected for additional testing. One effect might be that different values in the same column get tested against different classes. If in some of the earlier-tested data values of the column it observes data apparently classified as phone numbers "(xxx) xxx-xxxx", then this might prompt testing against data classes in clusters with the 'US Phone Number' data class in them. In later-tested data values with format "xxx-xx-xxxx", if it observes data apparently classified as Social Security Numbers, this would cause testing against data classes in clusters with the 'US Social Security Number' data class in them.

One example of a learning process scans previous classification results (which results, how many, how historic can be dynamic/parameterized), to:

Form cluster(s) of data classes that have matched given column names;

Create an association between term(s) derived from the column name using governance tools and different dataset classes, and create confidence for the association based on the number/percentage of times the term is associated to the data class; and/or Prepare a pattern of the column name combinations that lead to a probable match with a particular data class, and form an association between the pattern of columns and the probable matches of data class(es).

The learned historical classification characteristics can be used to filter-out unnecessary data classes for comparison to a target column, for instance by:

Considering only the classes in any clusters selected as being applicable to the column (e.g. based on term assignment or context, for instance);

Considering only data classes for which a confidence level that they properly classify the target column is above a threshold value; and/or Considering only the data classes that are associated with a pattern of columns matching those columns in the target dataset.

Optimization of the data classification process is provided by avoiding testing every available data class against the relevant values of every column. A dynamic selection of which data classes to compare to column value(s) is provided, while dynamically eliminating other classes that are not to be considered.

In aspects, a system and method are provided to efficiently classify data to reduce the classification time by choosing/giving priority to data classes that are found to most probably match. Filtering-out data class candidates can be based on selecting only those data classes that match to the target column through a term assignment and/or selecting only those data classes that match to the target based on column location. A method can compare the column against a union of data classes chosen based on the preceding two selections, and prepare a scoring or confidence for each of them. The column could be classified using the data class from this union that has the highest score or confidence. Machine learning can be used to reduce the number of data classes to compare against the target dataset. A cluster of data classes can be selected that match the target column name. Scoring of the associations between term(s) (assigned to the column) and corresponding data classes associated with those term(s) can be performed. Additionally or alternatively, a pattern of the column name combinations that lead to a probable match with data class(es) can be identified and used to create an association between them. Data classes filtered out from the overall collection based on any of the preceding can be used to compare with the target column.

By way of a specific example, assume a target column has a column name "ZipCode". When auto assigning a data class to that column, a conventional approach will compare each column value against each the data classes in the collection of available classes. In contrast, aspects described herein might use a term assignment 'ZipCode' and/or column name-based identification to identify the 'US Zip' data class and compare only to that data class. For a target column of 1,000 relevant data values (e.g. excluding the column name row and any other extraneous rows), this could classify the column using a maximum of 1,000 comparisons.

By way of another specific example, assume a column is named "Column1". Initially, it may be observed based on testing a data value of the column that the column contains a date. Rather than having to test each of various other date data classes (Date of Birth, Expiry Date, Departure Date, etc. which are clustered with the tested date class) to determine which could be a candidate, matching to the first Date informs that the value also matches positive to these other date classes (Data of Birth, Expiry Date, Departure Date, etc.) on the basis that these classes are clustered. Additionally, all string type data classes can be excluded from testing against value(s) of the column.

Aspects differ from approaches that provide merely for the selection of a 'best matching' data class based on comparing all column values against all of the collection of available data classes. In contrast, aspects described herein reduce the number of candidate data classes that the particular target data column is to be compared against to classify the column's data into a specific data class. The number of comparisons can be reduced by intelligently predicting to which data class(es) the column might possibly/probably match.

FIG. 4 depicts an example process for data classification, in accordance with aspects described herein. In some examples, the process is performed by one or more computer systems, such as those described herein, which may include one or more data classification computer systems as described with reference to FIG. 1.

The process begins by tracking (402) classification of each column of data, of a plurality of columns of data, into a respective data class of a collection of candidate data classes that are available for classifying the column of data. The tracking provides historical data classification characteristics for subsequent use. The characteristics are anything that represents knowledge we can be applied to classifying a target column, for instance confidence levels, identified data class clusters, and accurate term assignments to column names, as examples.

The tracking classification of each column of data of the plurality of columns of data can determines confidence levels of associations between term(s) and candidate data classes in the collection of candidate data classes, and assign the term(s) to the candidate data classes.

The process continues by obtaining (404) a target column of data of a target dataset. The target column of data is to be classified into a data class of the collection of candidate data classes. The process associates (406), based on a column name of the target column of data, term(s) with the column of data. For instance, the column is tagged with tag(s)/term(s) to help relate the column to candidate data classes. The process then classifies (408) the target column of data into a data class of the collection of candidate data classes based on the historical data classification characteristics provided by the tracking. For instance, the classifying includes selecting a group of candidate data classes of the collection of candidate data classes to compare to at least some data values of the target column of data. The selecting can exclude at least some candidate data classes of the collection of candidate data classes from comparison to the at least some values of the target column of data. Additionally or alternatively, selecting the group of candidate data classes can be further based on the determined confidence levels mentioned above. In yet further examples, the selecting selects at least one candidate data class, of the group of candidate data classes, based on (i) the at least one data class having been previously associated with the one or more terms, and/or (ii) at least one data class having been previously selected to classify columns of data, of the plurality of columns of data, that are also associated with the one or more terms.

Returning to 408 of FIG. 4, the classifying also establishes a priority between the candidate data classes of the group of candidate data classes in comparing the at least some data values of the target column of data to the selected group of candidate data classes. As an example, establishing the priority between the candidate data classes of the group of candidate data classes is based on confidence levels assigned to the candidate data classes of the group of candidate data classes. The confidence levels can be based on a number of columns of data, of the plurality of columns of data, classified into each of the candidate data classes of the group of candidate data classes on the basis of (i) terms assigned to number of columns of data, and/or (ii) column names of the number of columns of data. In other words, this is directed to prioritizing within the classes selected to compare to the target column. The classes can have assigned confidence levels that are a function of (i) the number of columns they have historically classified based on term assignments and/or (ii) column names of the columns that they have historically classified. As an example, confidence for a data class that has classified columns named "Name" only twice would likely have a lower confidence relative to if the data class classified "First Name" columns twenty times.

The classifying (408) can include matching a data value of the target column of data to a data class of a first cluster of the established clusters (see FIG. 5) of candidate data classes (e.g. by testing a value in the column to find an applicable data class, then finding a cluster in which that class is a member). Selecting the group of candidate data classes can include selecting other data classes of that first cluster for inclusion in the selected group of candidate classes, based on matching the data value to the data class of the first cluster.

Figure 5:
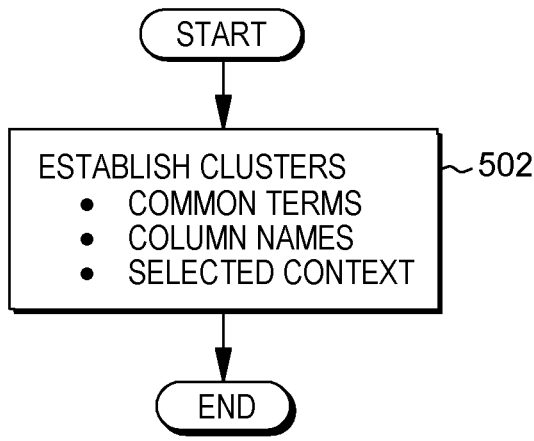
FIG. 5 depicts an example process for tracking classification of data columns, in accordance with aspects described herein.

FIG. 5 depicts an example process for tracking classification of data columns, in accordance with aspects described herein. The process can be performed by one or more computer systems, such as those described herein. The process establishes (502) clusters of candidate data classes, of the collection of candidate data classes, that have classified related columns of data. By related is mean that some identifiable relation is present as between the columns that those classes have classified. As an example, a cluster could cluster classes applied to columns with a common column name. As another example, a cluster could cluster classes that are contextually related. Establishing the clusters of candidate data classes can establish a first cluster that clusters candidate data classes related by common terms of a glossary of terms directed to a specific business domain. Since target columns of data often have a column name, establishing the clusters of candidate data classes can establish clusters of classes that have classified columns with common or similar column names. Thus, a first cluster can cluster candidate data classes that have classified columns of data having lexicographically similar column names, as a relation between the classified columns of data. Selecting the group of candidate data classes when classifying a target column can select, from the established clusters of candidate data classes, the first cluster based on the column name of the target column of data matching to the lexicographically similar column names. For instance, the cluster could include classes that have classified columns named "First Name", "F_Name", "FName", and "G_Name".

Additionally or alternatively, establishing the clusters of candidate data classes can establish a first cluster that clusters candidate data classes that have classified columns of data appearing together in a selected context as a relation between the classified columns of data, for instance they appear in a given order, they tend to be near each other, they are commonly found in the given business domain/context of the target column, etc. Classifying the target column of data can include identifying that a context in which the target column of data appears is the selected context, based on classifying one or more additional columns of the target dataset (e.g. column(s) around the target column) with data classes of the first cluster. In this case, selecting the group of candidate data classes for comparison to the target column can include selecting other data classes of the first cluster for inclusion in the selected group of candidate classes, based on matching the data value to the data class of the first cluster. The selected context can be selected a (i) a proximity of the classified columns appearing together in a classified dataset, and/or (ii) a particular order in which the classified columns consecutively appear together in a classified dataset, as examples.

Figure 6:
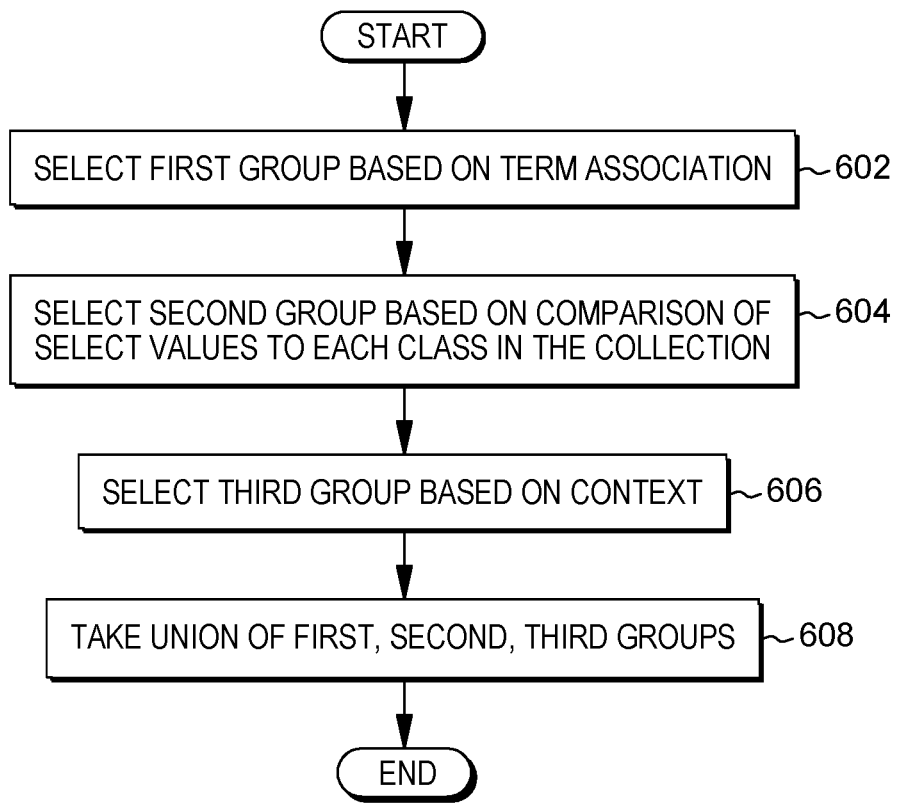
FIG. 6 depicts an example process for selecting candidate data classes to compare to values of a target column of data, in accordance with aspects described herein.

FIG. 6 depicts an example process for selecting candidate data classes to compare to values of a target column of data, in accordance with aspects described herein. The example of FIG. 6 tracks a specific embodiment described above. The process (i) selects (602) a first group of at least one data class, of the collection of data classes, that is prior-associated with one or more terms also associated with the target column of data (e.g. a cluster of data classes that are typically assigned for a term associated with the target column), (ii) selects (604) a second group of at least one data class, of the collection of data classes, based on a comparison of one or more data values of the target column of data to each data class of the collection of data classes, the second group of at least one data class being those data classes to which any data value of the one or more data values of the target column of data are found to match (e.g. compare value(s) of the column to all in the collection, build a list of matches, and form this second group of at least one data class), (iii) selects (606) a third group of at least one data class, of the collection of data classes, that is prior-clustered with one or more data classes into which one or more other columns of data in the target dataset have been classified, and which appear together with the target column of data in a selected context (e.g. Select class(es) that have been clustered (i.e. by past learning) with other classes that have classified other columns in the same context as this target column), and (iv) taking (608) a union of the first group, second, group, and third group. Optionally, further filtering on the union could be performed, for instance based on domain as described above.

Although various examples are provided, variations are possible without departing from a spirit of the claimed aspects.

Figure 7:
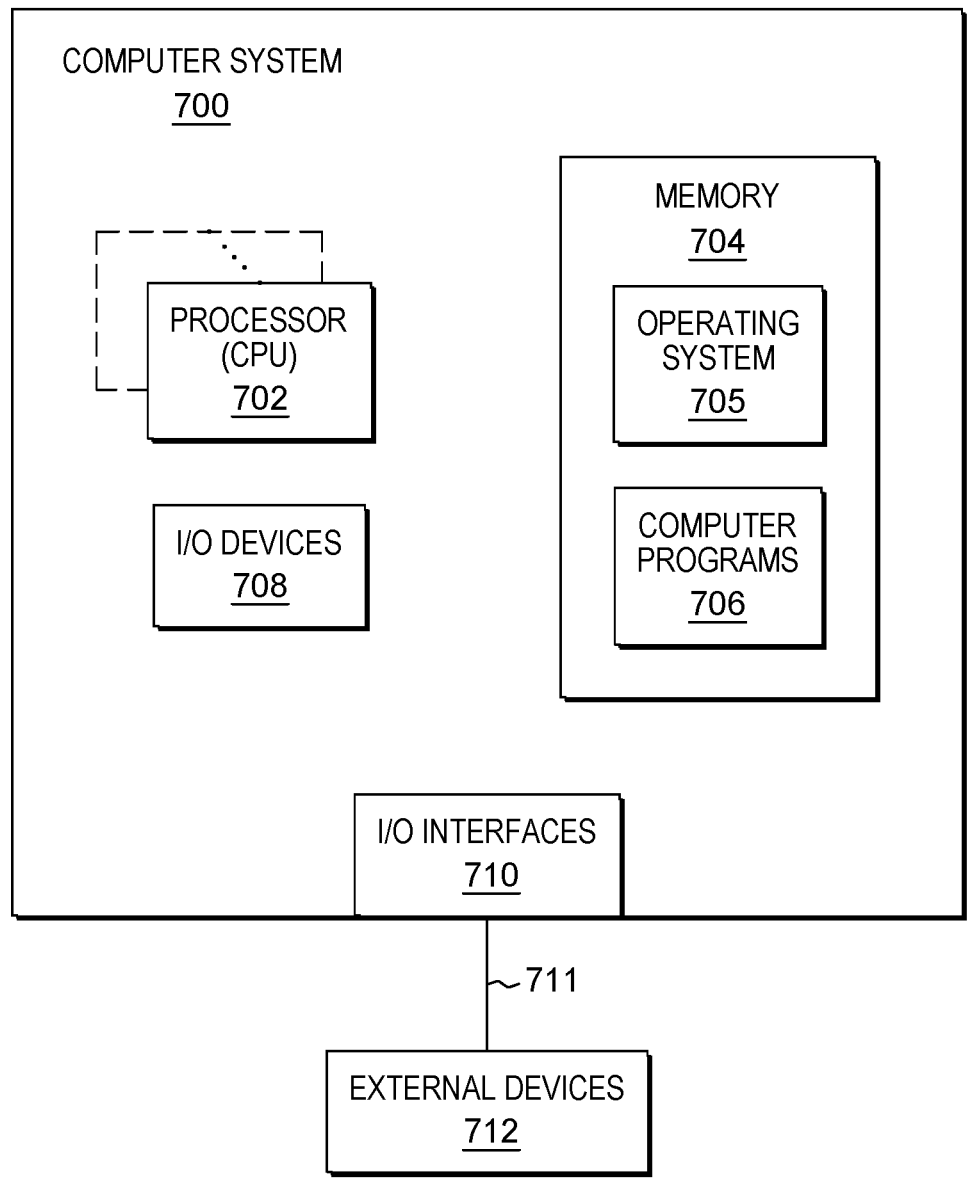
FIG. 7 depicts one example of a computer system and associated devices to incorporate and/or use aspects described herein.

Processes described herein may be performed singly or collectively by one or more computer systems, such as one or more data classification computer systems, as an example. FIG. 7 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 7 shows a computer system 700 in communication with external device(s) 712. Computer system 700 includes one or more processor(s) 702, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 702 can also include register(s) to be used by one or more of the functional components. Computer system 700 also includes memory 704, input/output (I/O) devices 708, and I/O interfaces 710, which may be coupled to processor(s) 702 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 704 can be or include main or system memory (e.g. Random Access Memory) used in the execution of program instructions, storage device(s) such as hard drive(s), flash media, or optical media as examples, and/or cache memory, as examples. Memory 704 can include, for instance, a cache, such as a shared cache, which may be coupled to local caches (examples include L1 cache, L2 cache, etc.) of processor(s) 702. Additionally, memory 704 may be or include at least one computer program product having a set (e.g., at least one) of program modules, instructions, code or the like that is/are configured to carry out functions of embodiments described herein when executed by one or more processors.

Memory 704 can store an operating system 705 and other computer programs 706, such as one or more computer programs/applications that execute to perform aspects described herein. Specifically, programs/applications can include computer readable program instructions that may be configured to carry out functions of embodiments of aspects described herein.

Examples of I/O devices 708 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (712) coupled to the computer system through one or more I/O interfaces 710.

Computer system 700 may communicate with one or more external devices 712 via one or more I/O interfaces 710. Example external devices include a keyboard, a pointing device, a display, and/or any other devices that enable a user to interact with computer system 700. Other example external devices include any device that enables computer system 700 to communicate with one or more other computing systems or peripheral devices such as a printer. A network interface/adapter is an example I/O interface that enables computer system 700 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 710 and external devices 712 can occur across wired and/or wireless communications link(s) 711, such as Ethernet-based wired or wireless connections. Example wireless connections include cellular, Wi-Fi, Bluetooth®, proximity-based, near-field, or other types of wireless connections. More generally, communications link(s) 711 may be any appropriate wireless and/or wired communication link(s) for communicating data.

Particular external device(s) 712 may include one or more data storage devices, which may store one or more programs, one or more computer readable program instructions, and/or data, etc. Computer system 700 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 700 may be operational with numerous other general purpose or special purpose computing system environments or configurations. Computer system 700 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
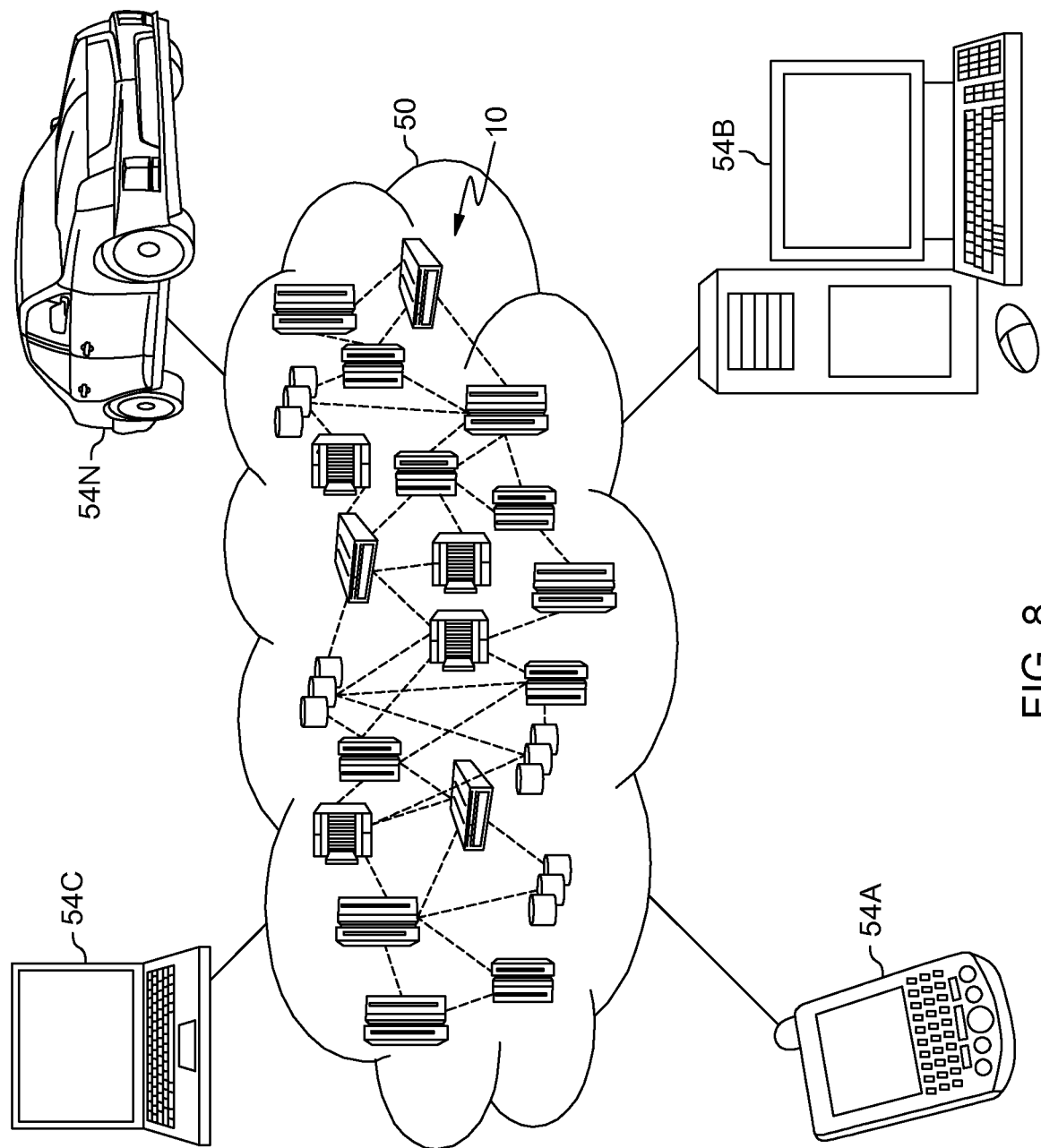
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
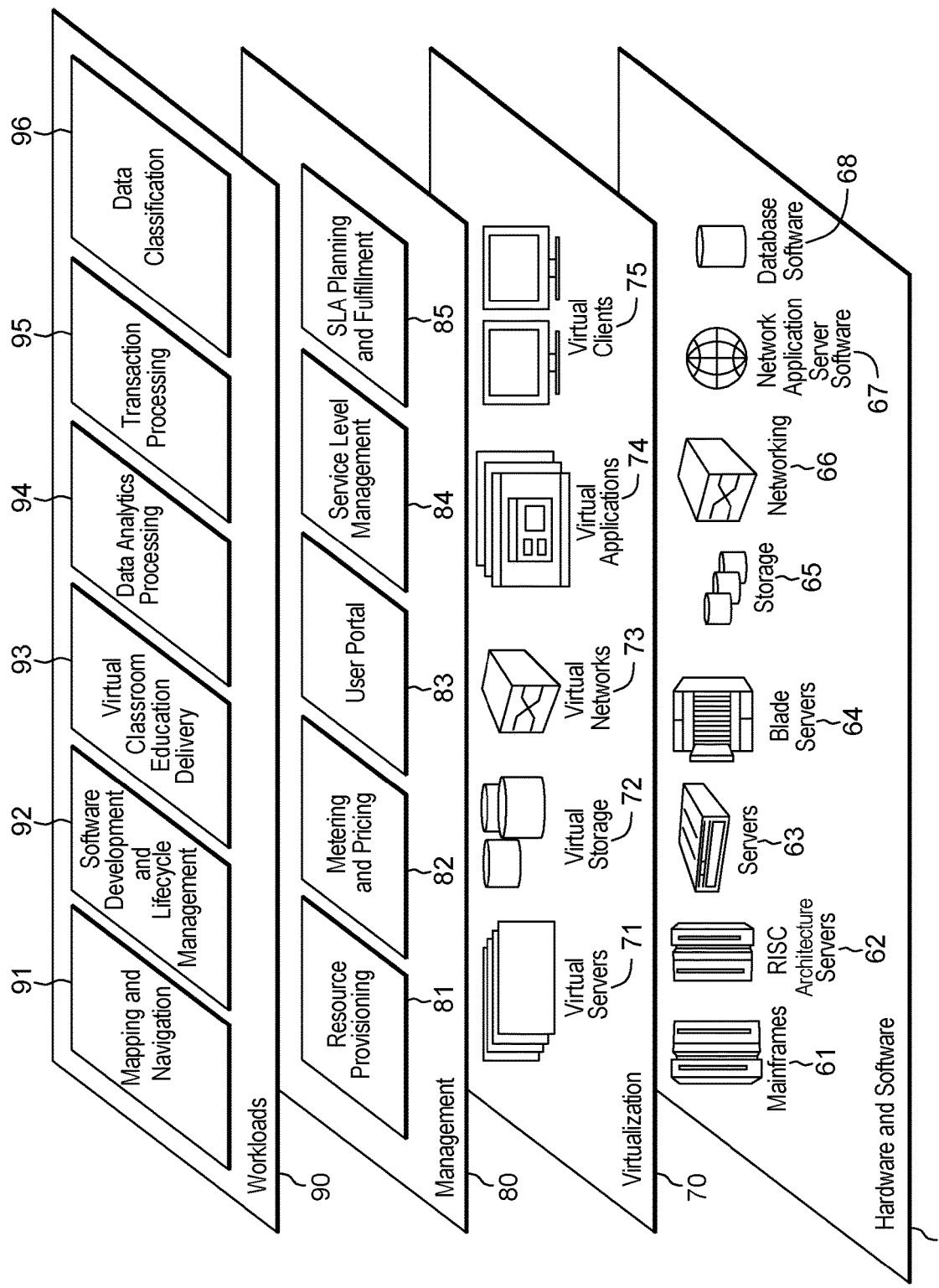
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data classification 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
tracking classification of each column of data, of a plurality of columns of data, into a respective data class of a collection of candidate data classes that are available for classifying the column of data, wherein the tracking provides historical data classification characteristics for subsequent use;
obtaining a target column of data of a target dataset, the target column of data to be classified into a data class of the collection of candidate data classes; and
classifying the target column of data into a data class of the collection of candidate data classes based on the historical data classification characteristics provided by the tracking, wherein the classifying comprises:
selecting a group of candidate data classes of the collection of candidate data classes to compare to at least some data values of the target column of data, the selecting being based at least in part on confidence levels associated with candidate data classes of the collection of candidate data classes and informing confidences in properly classifying data, wherein the selecting excludes at least some candidate data classes of the collection of candidate data classes from comparison to the at least some values of the target column of data based on one or more of the confidence levels associated with candidate data classes of the collection of data classes;
establishing a priority between the candidate data classes of the selected group of candidate data classes in comparing the at least some data values of the target column of data to the selected group of candidate data classes, the established priority indicating an order in which to compare candidate data classes of the selected group of candidate data classes to the at least some data values of the target column of data;
commencing comparing, iteratively and in the order indicated by the established priority, the at least some data values of the target column of data to the selected group of candidate data classes, wherein the excluded at least some candidate data classes of the collection of candidate data classes are excluded from comparison to the at least some values of the target column of data; and
based on the comparing, classifying the target column of data into a data class of the selected group of candidate data classes, the classifying being further based on the data class of the selected group of candidate data classes matching the target column of data with at least a threshold level of confidence.

2. The method of claim 1, further comprising associating, based on a column name of the target column of data, one or more terms with the target column of data, wherein the selecting selects at least one candidate data class, of the group of candidate data classes, based on at least one selected from the group consisting of: (i) the at least one data class having been previously associated with the one or more terms, and (ii) the at least one data class having been previously selected to classify columns of data, of the plurality of columns of data, that are also associated with the one or more terms.

3. The method of claim 2, wherein the tracking classification of each column of data of the plurality of columns of data determines the confidence levels associated with the candidate data classes as confidence levels of associations between the one or more terms and the candidate data classes in the collection of candidate data classes, and assigns the one or more terms to the candidate data classes.

4. The method of claim 1, wherein the tracking further comprises establishing clusters of candidate data classes, of the collection of candidate data classes, that have classified related columns of data.

5. The method of claim 4, wherein the classifying comprises matching a data value of the target column of data to a data class of a first cluster of the established clusters of candidate data classes, and wherein the selecting the group of candidate data classes comprises selecting other data classes of the first cluster for inclusion in the selected group of candidate classes based on matching the data value to the data class of the first cluster.

6. The method of claim 4, wherein the target column of data has a column name, wherein the establishing the clusters of candidate data classes establishes a first cluster that clusters candidate data classes that have classified columns of data having lexicographically similar column names, as a relation between the classified columns of data, and wherein the selecting the group of candidate data classes comprises selecting, from the established clusters of candidate data classes, the first cluster based on the column name of the target column of data matching to the lexicographically similar column names.

7. The method of claim 4, wherein the establishing the clusters of candidate data classes establishes a first cluster that clusters candidate data classes that have classified columns of data appearing together in a selected context, as a relation between the classified columns of data, wherein the classifying the target column of data comprises identifying that a context in which the target column of data appears is the selected context, based on classifying one or more additional columns of the target dataset with one or more data classes of the first cluster, and wherein the selecting the group of candidate data classes comprises selecting other data classes of the first cluster for inclusion in the selected group of candidate classes, based on matching the data value to the data class of the first cluster.

8. The method of claim 7, wherein the selected context is selected from the group consisting of: (i) a proximity of the classified columns appearing together in a classified dataset, and (ii) a particular order in which the classified columns consecutively appear together in a classified dataset.

9. The method of claim 4, wherein the establishing the clusters of candidate data classes establishes a first cluster that clusters candidate data classes related by common terms of a glossary of terms directed to a specific business domain.

10. The method of claim 1, wherein the establishing the priority between the candidate data classes of the group of candidate data classes is based on confidence levels assigned to the candidate data classes of the group of candidate data classes, the confidence levels being based on a number of columns of data, of the plurality of columns of data, classified into each of the candidate data classes of the group of candidate data classes on the basis of at least one selected from the group consisting of: (i) terms assigned to a number of columns of data, and (ii) column names of the number of columns of data.

11. The method of claim 1, wherein the selecting the group of candidate data classes comprises:
(i) selecting a first group of at least one data class, of the collection of data classes, that is prior-associated with one or more terms also associated with the target column of data;
(ii) selecting a second group of at least one data class, of the collection of data classes, based on a comparison of one or more data values of the target column of data to each data class of the collection of data classes, the second group of at least one data class being those data classes to which any data value of the one or more data values of the target column of data are found to match;
(iii) selecting a third group of at least one data class, of the collection of data classes, that is prior-clustered with one or more data classes into which one or more other columns of data in the target dataset have been classified, and which appear together with the target column of data in a selected context; and
(iv) taking a union of the first group, second group, and third group.

12. A computer system comprising:
a memory; and
a processor in communication with the memory, wherein the computer system is configured to perform a method comprising:
tracking classification of each column of data, of a plurality of columns of data, into a respective data class of a collection of candidate data classes that are available for classifying the column of data, wherein the tracking provides historical data classification characteristics for subsequent use;
obtaining a target column of data of a target dataset, the target column of data to be classified into a data class of the collection of candidate data classes; and
classifying the target column of data into a data class of the collection of candidate data classes based on the historical data classification characteristics provided by the tracking, wherein the classifying comprises:
selecting a group of candidate data classes of the collection of candidate data classes to compare to at least some data values of the target column of data, the selecting being based at least in part on confidence levels associated with candidate data classes of the collection of candidate data classes and informing confidences in properly classifying data, wherein the selecting excludes at least some candidate data classes of the collection of candidate data classes from comparison to the at least some values of the target column of data based on one or more of the confidence levels associated with candidate data classes of the collection of data classes;
establishing a priority between the candidate data classes of the selected group of candidate data classes in comparing the at least some data values of the target column of data to the selected group of candidate data classes, the established priority indicating an order in which to compare candidate data classes of the selected group of candidate data classes to the at least some data values of the target column of data;
commencing comparing, iteratively and in the order indicated by the established priority, the at least some data values of the target column of data to the selected group of candidate data classes, wherein the excluded at least some candidate data classes of the collection of candidate data classes are excluded from comparison to the at least some values of the target column of data; and
based on the comparing, classifying the target column of data into a data class of the selected group of candidate data classes, the classifying being further based on the data class of the selected group of candidate data classes matching the target column of data with at least a threshold level of confidence.

13. The computer system of claim 12, wherein the method further comprises associating, based on a column name of the target column of data, one or more terms with the target column of data, wherein the selecting selects at least one candidate data class, of the group of candidate data classes, based on at least one selected from the group consisting of: (i) the at least one data class having been previously associated with the one or more terms, and (ii) the at least one data class having been previously selected to classify columns of data, of the plurality of columns of data, that are also associated with the one or more terms, wherein the tracking classification of each column of data of the plurality of columns of data determines the confidence levels associated with the candidate data classes as confidence levels of associations between the one or more terms and candidate data classes in the collection of candidate data classes, and assigns the one or more terms to the candidate data classes.

14. The computer system of claim 12, wherein the tracking further comprises establishing clusters of candidate data classes, of the collection of candidate data classes, that have classified related columns of data, wherein the classifying comprises matching a data value of the target column of data to a data class of a first cluster of the established clusters of candidate data classes, and wherein the selecting the group of candidate data classes comprises selecting other data classes of the first cluster for inclusion in the selected group of candidate classes based on matching the data value to the data class of the first cluster.

15. The computer system of claim 12, wherein the tracking further comprises establishing clusters of candidate data classes, of the collection of candidate data classes, that have classified related columns of data, wherein the target column of data has a column name, wherein the establishing the clusters of candidate data classes establishes a first cluster that clusters candidate data classes that have classified columns of data having lexicographically similar column names, as a relation between the classified columns of data, and wherein the selecting the group of candidate data classes comprises selecting, from the established clusters of candidate data classes, the first cluster based on the column name of the target column of data matching to the lexicographically similar column names.

16. The computer system of claim 12, wherein the tracking further comprises establishing clusters of candidate data classes, of the collection of candidate data classes, that have classified related columns of data, wherein the establishing the clusters of candidate data classes establishes a first cluster that clusters candidate data classes that have classified columns of data appearing together in a selected context, as a relation between the classified columns of data, wherein the classifying the target column of data comprises identifying that a context in which the target column of data appears is the selected context, based on classifying one or more additional columns of the target dataset with one or more data classes of the first cluster, wherein the selecting the group of candidate data classes comprises selecting other data classes of the first cluster for inclusion in the selected group of candidate classes, based on matching the data value to the data class of the first cluster, and wherein the selected context is selected from the group consisting of: (i) a proximity of the classified columns appearing together in a classified dataset, and (ii) a particular order in which the classified columns consecutively appear together in a classified dataset.

17. A computer program product comprising:
a computer readable storage medium readable by a processing circuit and storing instructions for execution by the processing circuit for performing a method comprising:
tracking classification of each column of data, of a plurality of columns of data, into a respective data class of a collection of candidate data classes that are available for classifying the column of data, wherein the tracking provides historical data classification characteristics for subsequent use;
obtaining a target column of data of a target dataset, the target column of data to be classified into a data class of the collection of candidate data classes; and
classifying the target column of data into a data class of the collection of candidate data classes based on the historical data classification characteristics provided by the tracking, wherein the classifying comprises:
selecting a group of candidate data classes of the collection of candidate data classes to compare to at least some data values of the target column of data, the selecting being based at least in part on confidence levels associated with candidate data classes of the collection of candidate data classes and informing confidences in properly classifying data, wherein the selecting excludes at least some candidate data classes of the collection of candidate data classes from comparison to the at least some values of the target column of data based on one or more of the confidence levels associated with candidate data classes of the collection of data classes;
establishing a priority between the candidate data classes of the selected group of candidate data classes in comparing the at least some data values of the target column of data to the selected group of candidate data classes, the established priority indicating an order in which to compare candidate data classes of the selected group of candidate data classes to the at least some data values of the target column of data;
commencing comparing, iteratively and in the order indicated by the established priority, the at least some data values of the target column of data to the selected group of candidate data classes, wherein the excluded at least some candidate data classes of the collection of candidate data classes are excluded from comparison to the at least some values of the target column of data; and
based on the comparing, classifying the target column of data into a data class of the selected group of candidate data classes, the classifying being further based on the data class of the selected group of candidate data classes matching the target column of data with at least a threshold level of confidence.

18. The computer program product of claim 17, wherein the tracking further comprises establishing clusters of candidate data classes, of the collection of candidate data classes, that have classified related columns of data, wherein the classifying comprises matching a data value of the target column of data to a data class of a first cluster of the established clusters of candidate data classes, and wherein the selecting the group of candidate data classes comprises selecting other data classes of the first cluster for inclusion in the selected group of candidate classes based on matching the data value to the data class of the first cluster.

19. The computer program product of claim 17, wherein the tracking further comprises establishing clusters of candidate data classes, of the collection of candidate data classes, that have classified related columns of data, wherein the target column of data has a column name, wherein the establishing the clusters of candidate data classes establishes a first cluster that clusters candidate data classes that have classified columns of data having lexicographically similar column names, as a relation between the classified columns of data, and wherein the selecting the group of candidate data classes comprises selecting, from the established clusters of candidate data classes, the first cluster based on the column name of the target column of data matching to the lexicographically similar column names.

20. The computer program product of claim 17, wherein the tracking further comprises establishing clusters of candidate data classes, of the collection of candidate data classes, that have classified related columns of data, wherein the establishing the clusters of candidate data classes establishes a first cluster that clusters candidate data classes that have classified columns of data appearing together in a selected context, as a relation between the classified columns of data, wherein the classifying the target column of data comprises identifying that a context in which the target column of data appears is the selected context, based on classifying one or more additional columns of the target dataset with one or more data classes of the first cluster, wherein the selecting the group of candidate data classes comprises selecting other data classes of the first cluster for inclusion in the selected group of candidate classes, based on matching the data value to the data class of the first cluster, and wherein the selected context is selected from the group consisting of: (i) a proximity of the classified columns appearing together in a classified dataset, and (ii) a particular order in which the classified columns consecutively appear together in a classified dataset.

* * * * *